(12) United States Patent
Kim

(10) Patent No.: US 9,017,860 B2
(45) Date of Patent: Apr. 28, 2015

(54) CYLINDER TYPE SECONDARY BATTERY

(75) Inventor: Dae-Kyu Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1339 days.

(21) Appl. No.: 12/618,694

(22) Filed: Nov. 13, 2009

(65) Prior Publication Data

US 2010/0216013 A1 Aug. 26, 2010

Related U.S. Application Data

(60) Provisional application No. 61/155,816, filed on Feb. 26, 2009.

(51) Int. Cl.
*H01M 2/02* (2006.01)
*H01M 2/00* (2006.01)
*H01M 2/04* (2006.01)
*H01M 2/14* (2006.01)
*H01M 10/04* (2006.01)

(52) U.S. Cl.
CPC .............. *H01M 2/00* (2013.01); *H01M 2/0482* (2013.01); *H01M 2/14* (2013.01); *H01M 10/0422* (2013.01)

(58) Field of Classification Search
USPC ......................................................... 429/164
See application file for complete search history.

(56) References Cited

U.S. PATENT DOCUMENTS

| 6,025,091 | A | 2/2000 | Kondo et al. |
| 2005/0014064 | A1 | 1/2005 | Matsubara |
| 2006/0078787 | A1* | 4/2006 | Sato et al. ................. 429/62 |
| 2008/0107957 | A1* | 5/2008 | Meguro et al. .............. 429/56 |

FOREIGN PATENT DOCUMENTS

| CN | 1579027 A | 2/2005 |
| EP | 1 443 573 A1 | 8/2004 |
| JP | 07-220716 | 8/1995 |
| JP | 2001-102028 | 4/2001 |
| JP | 2003-142146 | 5/2003 |
| JP | 2004-134204 | 4/2004 |
| JP | 2006-032253 | 2/2006 |
| KR | 10-2006-0112729 | 11/2006 |
| KR | 10-2007-0078860 | 8/2007 |

(Continued)

OTHER PUBLICATIONS

Japanese Office action dated Sep. 25, 2012, for corresponding Japanese Patent application 2010-038592, (1 page).

(Continued)

*Primary Examiner* — Ula C. Ruddock
*Assistant Examiner* — Jacob Marks
(74) *Attorney, Agent, or Firm* — Christie, Parker & Hale, LLP

(57) ABSTRACT

A cylinder type secondary battery includes a can having an opening, an electrode assembly in the can, a cap assembly covering the opening of the can, an upper insulating plate between the electrode assembly and the cap assembly; a support plate on the upper insulating plate; the support plate having a peripheral edge, wherein an area of the support plate is smaller than an area of the upper insulating plate, and a first electrode tab extending from the electrode assembly, the first electrode tab having a first section contacting the support plate, a second section contacting the cap assembly, and a bent section between the first section and the second section, wherein a portion of the bent section protrudes from the peripheral edge of the support plate.

26 Claims, 9 Drawing Sheets

(56) References Cited

FOREIGN PATENT DOCUMENTS

| KR | 10-2008-0007799 | 1/2008 |
|---|---|---|
| KR | 10-2008-0018471 | 2/2008 |

OTHER PUBLICATIONS

Patent Abstracts of Japan, and English machine translation of Japanese Publication 2001-102028 listed above, (12 pages).
Patent Abstracts of Japan, and English machine translation of Japanese Publication 2004-134204 listed above, (16 pages).
Patent Abstracts of Japan, and English machine translation of Japanese Publication 2006-032253 listed above, (16 pages).
English Translation of Korean Patent Publication No. 10-2006-0112729; dated Nov. 2, 2006.
English Translation of Korean Patent Publication No. 10-2007-0078860, dated Aug. 3, 2007.
European Office action dated Nov. 8, 2011, for corresponding European Patent application 10154714.9, 4 pages.
European Search Report dated May 26, 2010, for corresponding European Patent application 10154714.9, noting listed references in this IDS.
SIPO Office action dated Mar. 21, 2012, for corresponding Chinese Patent application 201010120487.9, with English translation, (11 pages).
KIPO Notice of Allowance dated Jul. 29, 2011, for corresponding Korean Patent application 10-2009-0112769, noting listed references in this IDS, as well as references previously submitted in an IDS, 2 pages.

\* cited by examiner

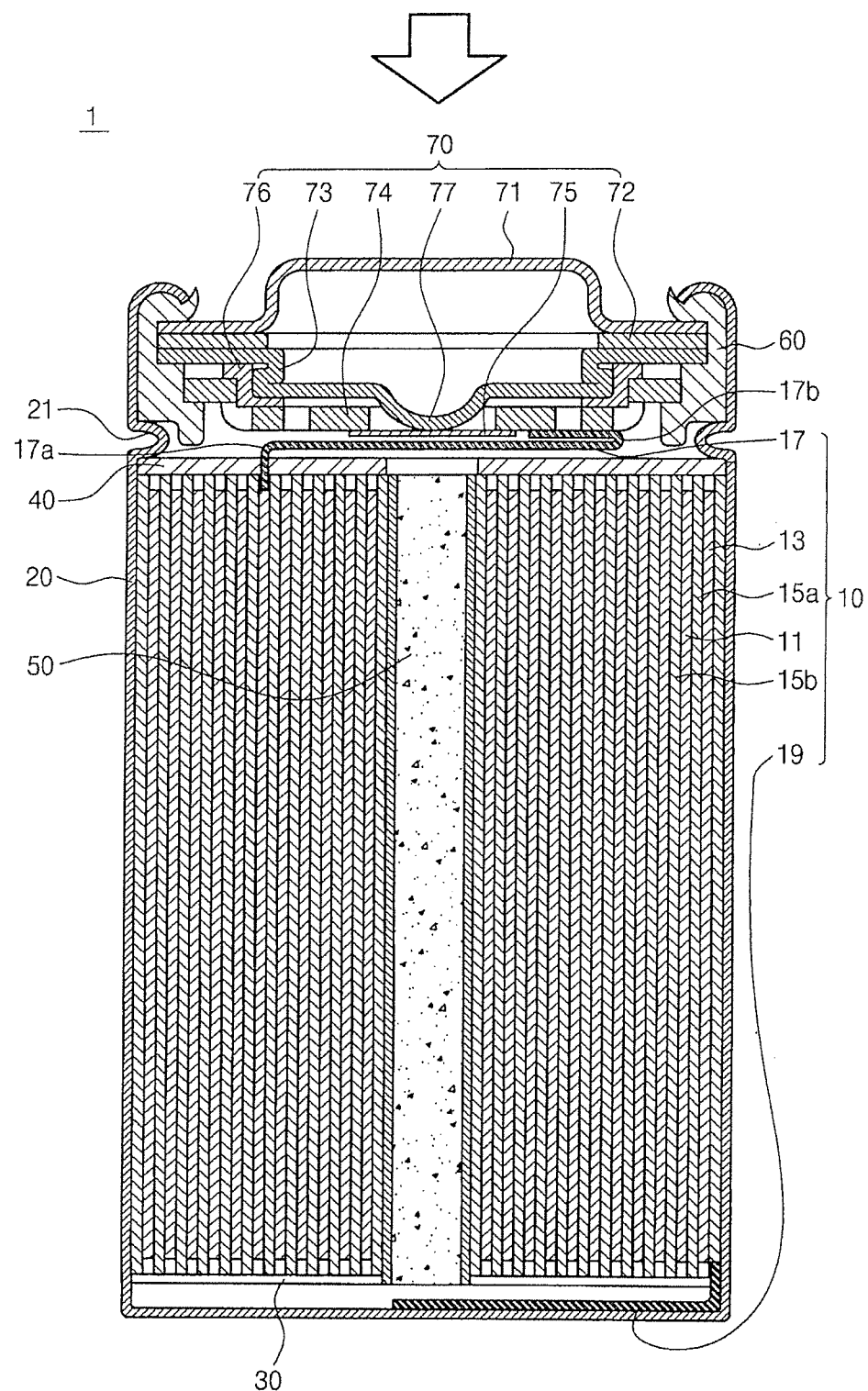

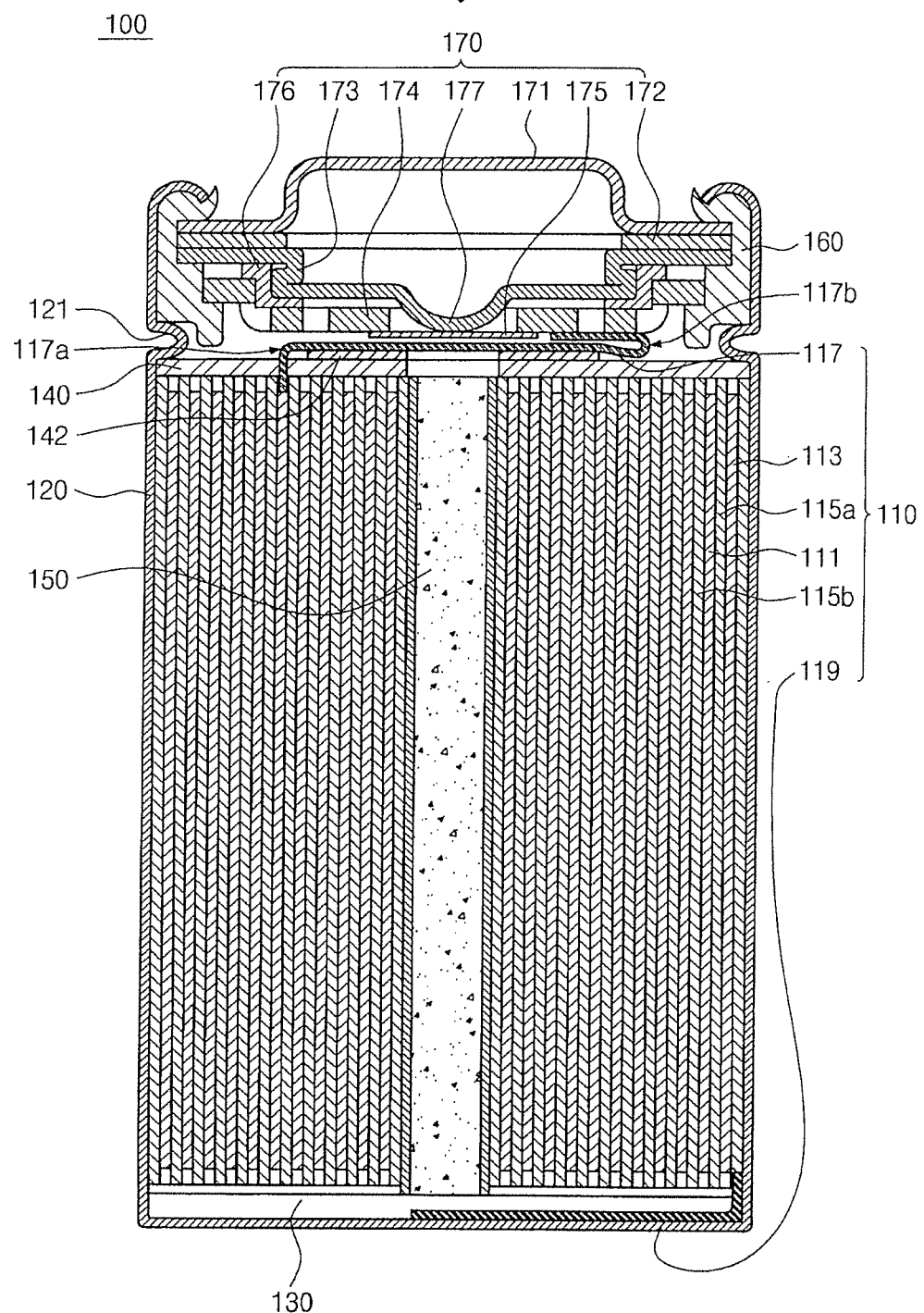

CYLINDER TYPE SECONDARY BATTERY

CROSS-REFERENCE TO RELATED APPLICATIONS

This application claims priority to and the benefit of U.S. Provisional Application No. 61/155,816 filed in the U.S. Patent Office on Feb. 26, 2009, the entire content of which is incorporated herein by reference.

BACKGROUND OF THE INVENTION

1. Field of the Invention

The present invention relates to a cylinder type secondary battery.

2. Description of the Related Art

In recent times, compact and lightweight mobile electronic/electric appliances such as cellular phones, notebook computers, camcorders, etc., are being rapidly developed and produced. In order to be able to operate the mobile electronic/electric appliances where there is no separate power source, secondary batteries are used. Such secondary batteries can be repeatedly used by charging and discharging, unlike disposable batteries, which cannot be recharged.

In addition, since secondary batteries have large capacities, they are also used for high-output products such as hybrid automobiles, power tools, etc., in addition to the mobile electronic/electric appliances.

Such secondary batteries include nickel-cadmium batteries, nickel-metal hydride batteries, nickel-zinc batteries, lithium ion secondary batteries, lithium polymer secondary batteries, etc. Among these, lithium secondary batteries are widely used due to their high operation voltage and energy density per unit weight.

Lithium secondary batteries are formed by housing an electrode assembly and electrolyte in an outer case, and then sealing the outer case. Lithium secondary batteries may be classified into a can type battery and a pouch type battery depending on a shape of the outer case, and the can type battery may be further classified as a cylinder type battery or a prismatic type battery.

A cylinder type secondary battery is formed by winding a positive electrode plate, a separator, and a negative electrode plate to form an electrode assembly, housing the electrode assembly and electrolyte in a cylindrical can, and sealing the cylindrical can with a cap assembly.

Uncoated portions on which positive or negative electrode active materials are not applied are on the positive and negative electrode plates of the electrode assembly. Electrode tabs are installed on the uncoated portions of the electrode plates, respectively. One of the electrode tabs extends upward toward the opening of the cylindrical can, and the other extends downward.

In addition, the electrode tab led upward is electrically connected to the cap assembly, and the electrode tab led downward is electrically connected to the bottom of the can.

However, since the electrode tab electrically connected to the cap assembly is bent and welded to the cap assembly such that stress is concentrated on the bent portion of the electrode tab, the electrode tab may be easily detached.

SUMMARY OF THE INVENTION

Aspects of the present invention provide a cylinder type secondary battery capable of preventing stress concentration on a bent portion of an electrode tab.

A cylinder type secondary battery is provided including a can having an opening, an electrode assembly in the can, a cap assembly covering the opening of the can, an upper insulating plate between the electrode assembly and the cap assembly; a support plate on the upper insulating plate; the support plate having a peripheral edge, wherein an area of the support plate is smaller than an area of the upper insulating plate, and a first electrode tab extending from the electrode assembly, the first electrode tab having a first section contacting the support plate, a second section contacting the cap assembly, and a bent section between the first section and the second section, wherein a portion of the bent section protrudes from the peripheral edge of the support plate.

In one embodiment, the support plate includes an insulating material, such as polyethylene or polypropylene. Further, in one embodiment, a portion of the bent section is adjacent to and overlaps the peripheral edge of the support plate. The support plate and the upper insulating plate may be made from the same material.

In one embodiment, the support plate has a central through-hole and is circular, rectangular or hexagonal. A thickness of the support plate may be from about 0.3 mm to about 0.5 mm and a length from the center of the upper insulating plate to the peripheral edge of the support plate is from about 85% to about 97% of a length of the first electrode tab extending from a center of the upper insulating plate to a periphery of the bent section.

In one embodiment, the upper insulating plate and the support plate are integral to one another and in another embodiment, the upper insulating plate and the support plate are modular.

In another embodiment, a cylinder type secondary battery is provided including a can having an opening; an electrode assembly in the can; a cap assembly covering the opening of the can; an upper insulating plate between the electrode assembly and the cap assembly, the upper insulating plate including a central section and a peripheral section surrounding the central section, wherein the central section has a peripheral edge and wherein a thickness of the central section is greater than a thickness of the peripheral section; and a first electrode tab extending from the electrode assembly, the first electrode tab having a first section contacting the central section of the upper insulating plate, a second section contacting the cap assembly, and a bent section between the first section and the second section, wherein a portion of the bent section is adjacent to and overlaps the peripheral edge of the central section.

In one embodiment, a radius of curvature of the bent section is from about 0.5 mm to about 0.6 mm.

In another embodiment, a method of assembling a cylinder type secondary battery is provided, the method including: inserting an electrode assembly into a can having an opening, the electrode assembly including a first electrode tab extending from the electrode assembly; placing an upper insulating plate on the electrode assembly; placing a support plate on the upper insulating plate, the support plate having a substantially planar surface and a peripheral edge, wherein an area of the support plate is smaller than an area of the upper insulating plate; configuring a first section of the first electrode tab to extend substantially parallel to the substantially planar surface of the upper insulating plate; bending a second section of the first electrode tab to extend substantially parallel to the first section of the first electrode tab and to form a bent section between the first section and the second section; covering the opening of the can with a cap assembly such that the second section of the first electrode tab contacts the cap assembly; forming a bead portion around a periphery of the can such that the bead portion contacts the upper insulating plate; and pressing the cap assembly to move the cap assembly toward the electrode assembly such that a portion of the bent section moves closer to the electrode assembly and next to the peripheral edge of the support plate.

In one embodiment, a radius of curvature of the bent section remains substantially the same when pressing the cap assembly.

In another embodiment, a cylinder type secondary battery 100 is provided including: a can having an opening; an electrode assembly in the can; a cap assembly covering the opening of the can; an upper insulating plate between the electrode assembly and the cap assembly; a support plate on the upper insulating plate; the support plate having a peripheral edge, wherein an area of the support plate is smaller than an area of the upper insulating plate; and a first electrode tab extending from the electrode assembly, the first electrode tab having a first section contacting the support plate, a second section contacting the cap assembly, and a bent section between the first section and the second section, wherein an outer radius of curvature of the bent portion is from about 0.5 mm to about 0.6 mm.

BRIEF DESCRIPTION OF THE DRAWINGS

These and/or other aspects of the present invention will become apparent and more readily appreciated from the following description of the embodiments, taken in conjunction with the accompanying drawings of which:

FIG. 1B is a cross-sectional view of the conventional cylinder type secondary battery after a pressing process;

FIG. 2C is a cross-sectional view of the cylinder type secondary battery in accordance with a first exemplary embodiment of the present invention after a pressing process;

DETAILED DESCRIPTION OF THE INVENTION

Figure 1A:
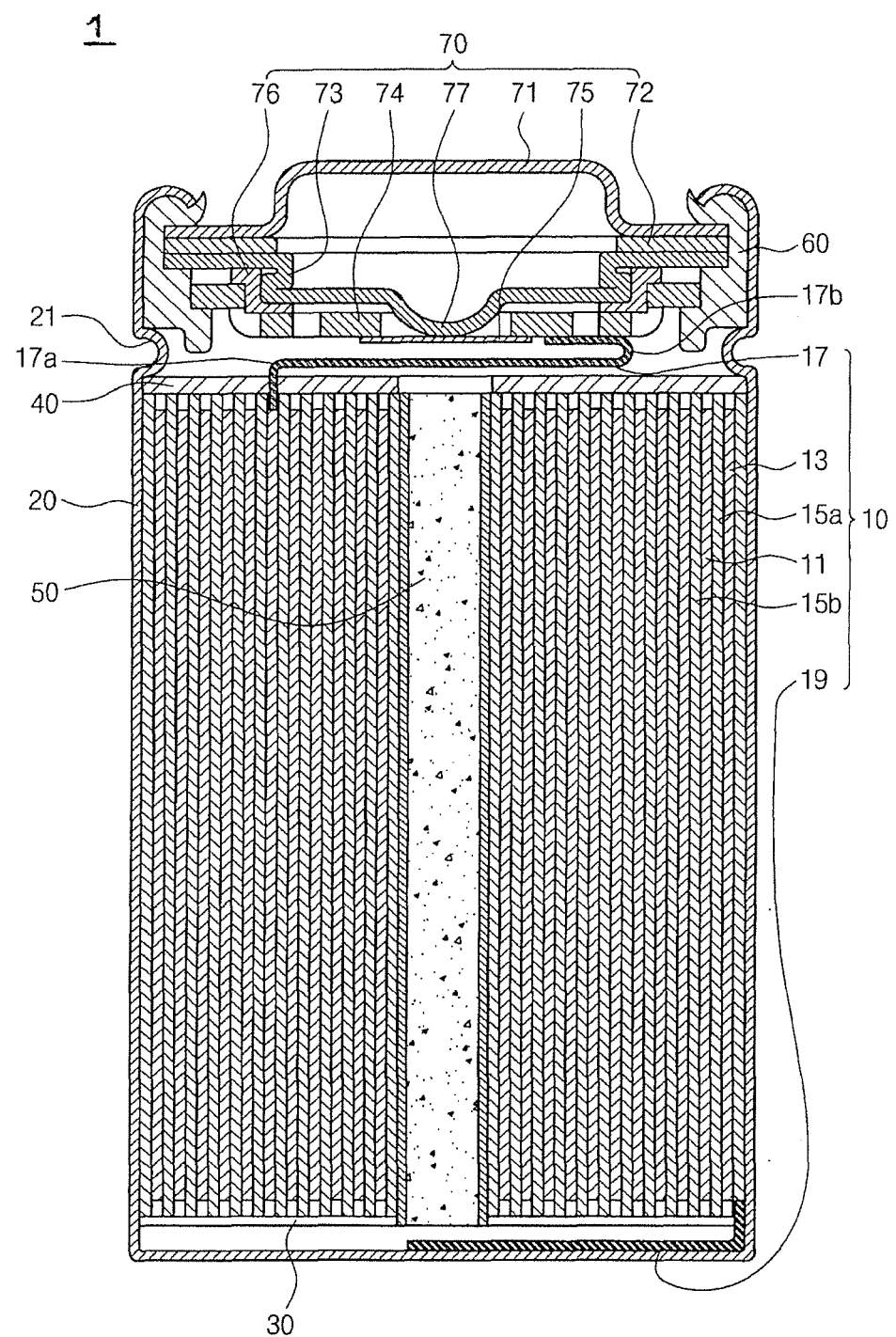
FIG. 1A is a cross-sectional view of a conventional cylinder type secondary battery.

The present invention will be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the lengths and thicknesses of layers and regions are exaggerated for clarity and may not be to scale, and like reference numerals designate like elements throughout the specification.

FIG. 1A is a cross-sectional view of a conventional cylinder type secondary battery, and FIG. 1B is a cross-sectional view of the conventional cylinder type secondary battery after a pressing process.

Referring to FIG. 1A, the cylinder type secondary battery 1 includes an electrode assembly 10, a can 20 for housing the electrode assembly 10, and a cap assembly 70 for sealing the can 20. In addition, the secondary battery 1 further includes a lower insulating plate 30, an upper insulating plate 40, a center pin 50, and an insulating gasket 60.

The electrode assembly 10 has a jellyroll shape in which first and second electrode plates 11 and 13 having a rectangular shape are deposited and wound, and separators 15a and 15b are interposed between the first and second electrode plates 11 and 13 to prevent a short circuit between the first and second electrode plates 11 and 13.

In addition, the first electrode plate 11 and the second electrode plate 13 have uncoated portions, respectively, to which a slurry is not applied. A first electrode tab 17 and a second electrode tab 19 are electrically attached to the uncoated portions, respectively. Here, the first electrode tab 17 is an upward electrode tab led toward an upper surface of the electrode assembly 10, and the second electrode tab 19 is a downward electrode tab led toward a lower surface of the electrode assembly 10.

The can 20 has an opening formed in one surface thereof. The electrode assembly 10 is inserted into the can 20 through the opening, the insulating gasket 60 is inserted into the opening of the can 20, and then the cap assembly 70 is coupled in the insulating gasket 60 to seal the can 20.

In addition, the can 20 includes a bead portion 21 bent from a side surface of the can toward the interior of the can 20 to correspond to an upper end level of the insulating plate 40.

The cap assembly 70 includes a cap-up 71 acting as an electrode terminal, and lower parts disposed under the cap-up 71. The lower parts include a positive temperature coefficient (PTC) thermistor 72, a vent 73, a cap-down 74, and a sub plate 75 which are sequentially disposed under the cap up 71. The sub plate 75 is connected to a projection 77 of the vent 73 exposed through a center hole using welding, etc.

The first electrode tab 17 led upward from the electrode assembly 10 is connected to a lower surface of the cap-down 74 or a lower surface of the sub plate 75 by welding, etc. The first electrode tab 17 is bent to form a first section 17a, a second section 17c and a bent section 17b between the first and second sections 17a, 17c and then welded to the cap assembly 70.

Next, referring to FIG. 1B, as described above, the electrode assembly 10 is inserted into the can 20 through the opening. After insertion of the insulating gasket 60 into the opening of the can 20, the cap assembly 70 is coupled in the insulating gasket 60, and the can 20 is sealed. Then a pressing process is performed to set the overall height of the assembled cylinder type secondary battery, i.e., to set the overall size of the cylinder type secondary battery and to prevent vertical movement of the electrode assembly.

As shown in FIG. 1B, the pressing process is performed by compressing an upper portion of the cylinder type secondary battery to reduce a space between the cap assembly and the electrode assembly, thereby decreasing the overall size of the battery and preventing vertical movement of the electrode assembly.

As shown in FIG. 1B, the bead portion 21 is compressed in the pressing process. In particular, the second section 17b of the first electrode tab 17 is compressed and stress is concentrated on the second section 17b such that the second section can be easily detached.

Figure 2A:
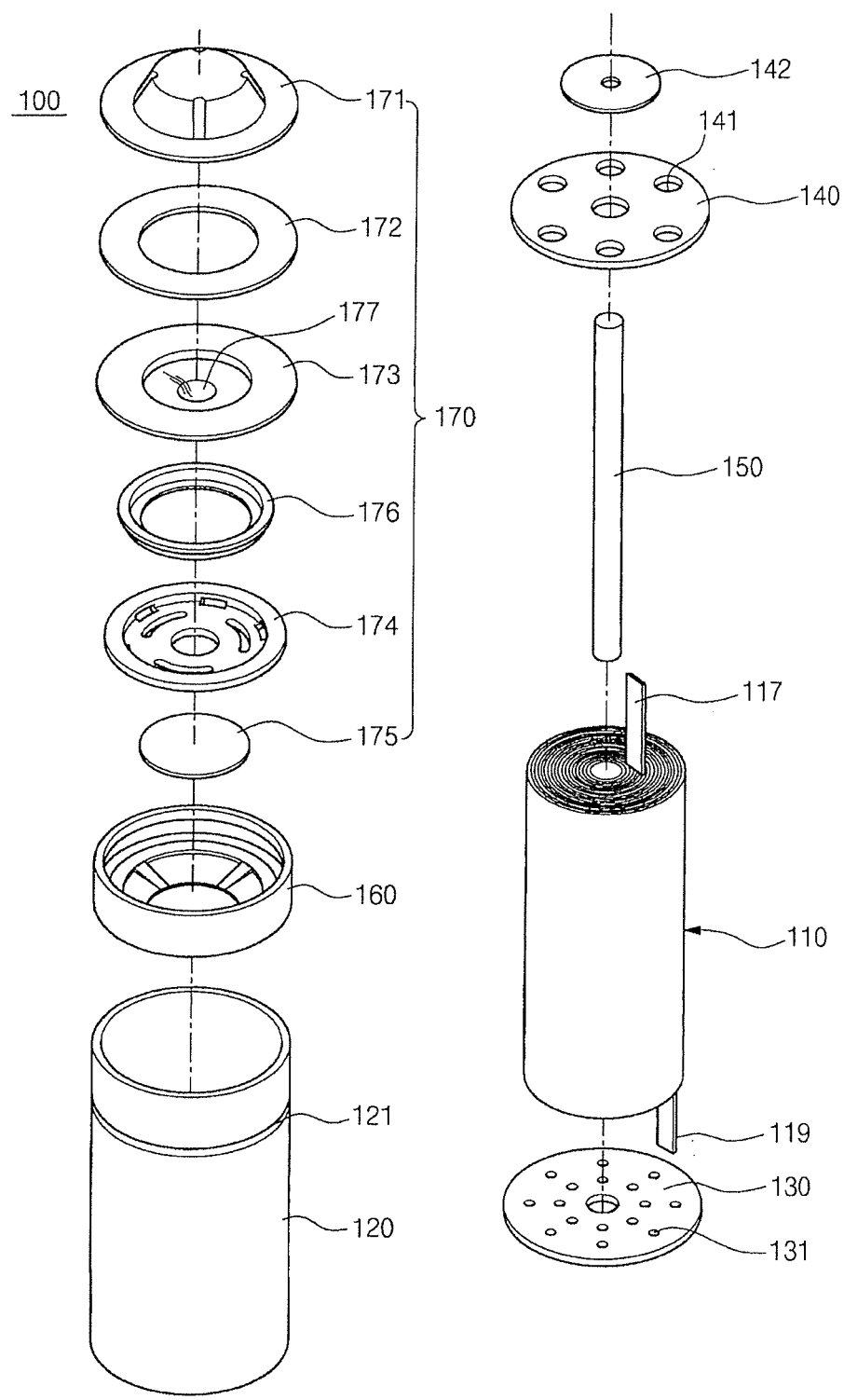
FIG. 2A is an exploded perspective view of a cylinder type secondary battery in accordance with a first exemplary embodiment of the present invention.
Figure 2B:
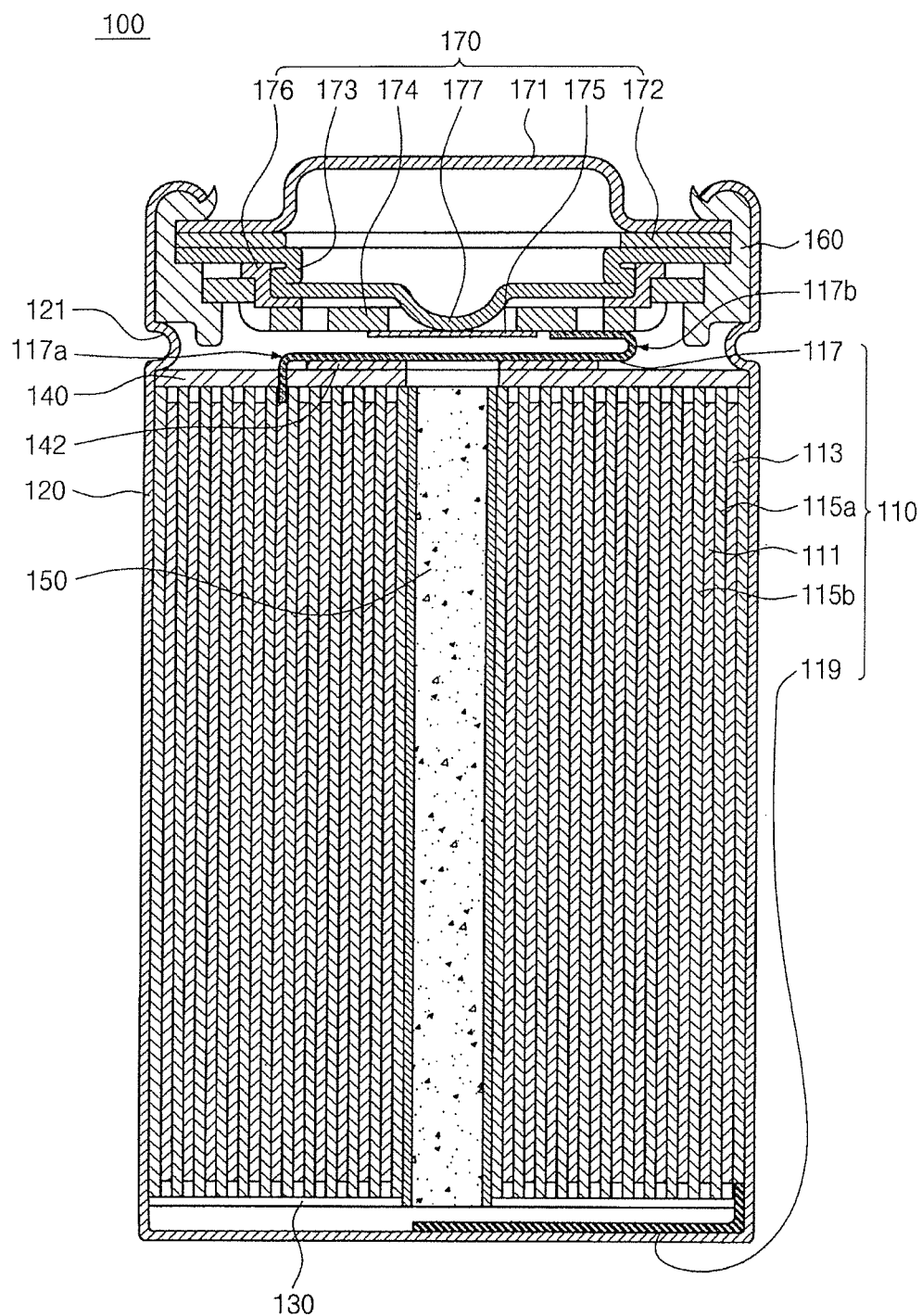
FIG. 2B is a cross-sectional view of the cylinder type secondary battery in accordance with a first exemplary embodiment of the present invention.

FIG. 2A is an exploded perspective view of a cylinder type secondary battery in accordance with a first exemplary embodiment of the present invention, FIG. 2B is a cross-sectional view of the cylinder type secondary battery in accordance with a first exemplary embodiment of the present invention, and FIG. 2C is a cross-sectional view of the cylinder type secondary battery in accordance with a first exemplary embodiment of the present invention after a pressing process.

First, referring to FIGS. 2A and 2B, the cylinder type secondary battery 100 in accordance with an exemplary embodiment of the present invention includes an electrode assembly 110, a can 120 for housing the electrode assembly 110, and a cap assembly 170 for sealing the can 120.

In addition, the cylinder type secondary battery further includes a lower insulating plate 130, an upper insulating plate 140, a center pin 150, and an insulating gasket 160.

The electrode assembly 110 may be formed in a jellyroll shape in which first and second electrode plates formed of rectangular plates are wound. The wound electrode assembly 110 has a hollow cylindrical shape with a center hole.

Next, the center pin 150 can be inserted into the center hole formed in a center portion of the electrode assembly 110. The center pin 150 prevents deformation of the electrode assembly 110 due to an external force. When the center pin 150 has a hollow structure, the center pin 150 acts as a moving passage of a gas generated from the electrode assembly 110.

The first and second electrode plates 111 and 113 have different polarities, and separators 115a and 115b are interposed between the first and second electrode plates to prevent a short circuit between the first and second electrode plates.

The first and second electrode plates 111 and 113 are formed by applying a positive active material slurry and a negative active material slurry to collector plates formed of aluminum and copper, respectively. The first electrode plate 111 may be a positive electrode plate in which the positive electrode slurry is applied to a positive electrode collector formed of aluminum or an aluminum alloy, and the second electrode plate 113 may be a negative electrode plate in which the negative electrode slurry is applied on a negative electrode collector formed of copper or a copper alloy.

In addition, the first electrode plate and the second electrode plate each include uncoated portions on which the slurry is not applied, and the first and second electrode tabs 117 and 119 are electrically attached to the uncoated portion of the first electrode plate and the second electrode plate respectively.

That is, the first electrode tab 117 is attached to the uncoated portion formed on the first electrode plate 111, and the second electrode tab 119 is attached to the uncoated portion formed on the second electrode plate 113.

Therefore, the first and second electrode tabs have the same polarities as the first and second electrode plates, respectively.

Here, the first electrode tab 117 may be led upward to an upper surface of the electrode assembly 110 toward the opening of the can 120, and the second electrode tab 119 may be led downward to a lower surface of the electrode assembly 110.

The can 120 may be formed of a metal such as aluminum, stainless steel, etc. In addition, the can 120 includes an opening formed in one surface thereof.

The electrode assembly 110 is inserted into the can 120 through the opening, and the lower insulating plate 130 is disposed at the lower surface of the electrode assembly 110.

The lower insulating plate 130 has a through-hole corresponding to the center hole of the electrode assembly 110, and may include a plurality of through-holes 131.

Here, the lower insulating plate 130 may be formed of polyethylene (PE) or polypropylene (PP), but is not limited thereto.

A welding rod is inserted through the center hole of the electrode assembly 110 and the through-hole 131 of the lower insulating plate 130 to weld the second electrode tab 110 to the lower surface of the can 120.

Therefore, the can 120 has the same polarity as the second electrode tab 119, and the can 120 itself acts as an electrode terminal.

Meanwhile, the upper insulating plate 140 can be positioned on the electrode assembly 110 inserted into the can 120, and has a through-hole corresponding to the center portion of the electrode assembly.

The upper insulating plate 140 may include a plurality of through-holes 141 so that electrolyte can readily sink into the electrode assembly 110. The first electrode tab 117 can be led to the exterior through the plurality of through-holes 141. While not shown, a separate hole may be formed to lead the first electrode tab 117 to the exterior.

Here, the upper insulating plate 140 may be formed of PE or PP, but is not limited thereto.

The can 120 includes a bead portion 121 formed by bending a side surface of the can 120 to the inside of the can 120 corresponding to an upper end level of the upper insulating plate 140. The bead portion 121 can prevent vertical movement of the electrode assembly 110 inserted into the can 120.

In addition, the insulating gasket 160 is inserted into the opening of the can 120, and the cap assembly 170 is coupled in the insulating gasket 160 to seal the can 120.

The insulating gasket 160 is formed of an insulating elastic material, has a shape surrounding the can assembly 170, and functions to insulate the can 120 and the cap assembly 170 having different polarities.

The cap assembly 170 includes a cap-up 171 acting as an electrode terminal, and lower parts disposed under the cap-up 171. The cap assembly 170 may be installed in the insulating gasket 160 as a single unit, or the respective parts may be sequentially installed in the insulating gasket 160.

The lower parts include a PTC thermistor 172, a vent 173, a cap-down 174, and a sub plate 175, which are sequentially disposed under the cap-up 171.

Specifically, the vent 173 is disposed under the PTC thermistor 172, and the cap-down 174 having a center hole is disposed under the vent 173 with an insulating material 176 interposed therebetween so that the vent 173 and the cap-down 174 are insulated by the insulating material 176.

The cap-down 174 may further include a through-hole through which a pressure can be applied to a lower surface of the vent 173, when the pressure in the battery is increased.

In addition, the sub plate 175 is positioned under the cap-down 174 to cross the center hole formed in the cap-down 174, and connected to a projection 177 of the vent 173 exposed through the center hole by welding, etc.

Therefore, the projection 177 projects downward from the cap assembly 170, i.e., in a direction of the electrode assembly 110 housed in the can 120.

The first electrode tab 117 led upward from the electrode assembly 110 is connected to a lower surface of the cap-down 174 or a lower surface of the sub plate 175 by welding, etc. Here, the cap-down 174 and the sub plate 175 may be coupled by laser welding, etc., and the projection of the vent 173 and the sub plate 175 may be coupled by ultrasonic welding, etc.

Hereinafter, characteristics of the cylinder type secondary battery in accordance with a first exemplary embodiment of the present invention will be described.

As described below, a support plate 142 functions to support a lower surface of the first electrode tab 117 including a first section 117a, a second section 117b and a bent portion 117c to prevent stress concentration on the bent section 117c. The support plate 142 has a through-hole formed at a region corresponding to center portions of the upper insulating plate and the electrode assembly.

Figure 5A:
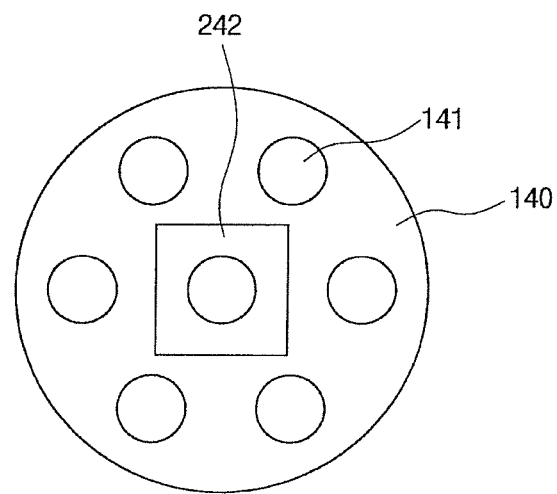
FIGS. 5A and 5B are plan views showing shapes of the support plate.
Figure 5B:
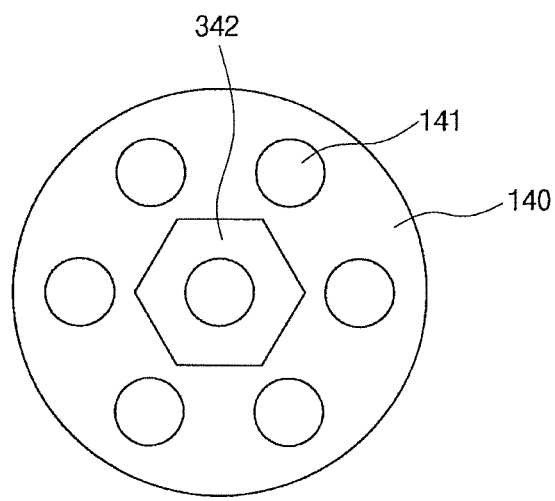

The support plate 142 may be formed of the same material as the upper insulating plate 140, and may have the same circular shape as the upper insulating plate 140. FIGS. 5A and 5B are plan views showing shapes of the support plate. As shown in FIG. 5A, the support plate 142 may have a rectangular shape 242, and as shown in FIG. 5B, this support plate may have a hexagonal shape 342, but is not limited to these materials and shapes.

Next, referring to FIG. 2C, the electrode assembly 110 is inserted into the can 120 through the opening, the insulating gasket 160 is inserted into the opening of the can 120, and then the cap assembly 170 is coupled in the insulating gasket 160 to seal the can 120, completing assembly of the cylinder type secondary battery. Next, a pressing process is performed to reduce the overall height of the cylinder type secondary battery, i.e., to reduce the overall size of the cylinder type secondary battery and to prevent vertical movement of the electrode assembly.

As shown in FIG. 2C, the pressing process is performed to compress an upper portion of the cylinder type secondary battery to reduce a space between the cap assembly and the electrode assembly, thereby decreasing the overall size of the battery and preventing vertical movement of the electrode assembly.

As a result of the pressing process, as shown in FIG. 2C, the bead portion 121 is compressed.

The cylinder type secondary battery in accordance with an exemplary embodiment of the present invention includes the support plate 142 on the upper insulating plate 140. The support plate 142 supports the lower surface of the first electrode tab 117 to prevent stress concentration on the bent section 117b.

Specifically, the first electrode tab 117 includes the first section 117a extending from the electrode assembly and bent parallel to the upper surface of the upper insulating plate 140, and the second section 117b extending parallel to the upper surface of the upper insulating plate 140 and connected to the lower surface of the cap-down 174 or the lower surface of the sub plate 175 and a bent section 117b between the first section 117a and the second section 117b.

The first section 117a has a generally "⌐" or "⌐" shape, and the bent section 117b has a generally "C" shape.

Provided that a distance from an edge of the first section 117a to an edge of the bent section 117b is a length L, both ends of the support plate 142 are designed to be positioned within the length L, and, in particular, an end of the support plate 142 is positioned inside the bent section 117b such that the bent section protrudes from the peripheral edge of the support plate.

As a result, since the bent section 117b may be positioned in a space formed by a step between the upper insulating plate 140 and the support plate 142, and may be pushed into a space formed by the step between the upper insulating plate and the support plate without compression of the bent section 117b during the pressing process, stress concentration on the second section 117b can be reduced or prevented.

That is, since the conventional cylinder type secondary battery has no space formed by the step between the upper insulating plate and the support plate, the second section is compressed, causing stress concentration thereon during the pressing process. However, in the cylinder type secondary battery in accordance with an exemplary embodiment of the present invention, since the bent section 117b can be pushed into the space formed by the step between the upper insulating plate and the support plate during the pressing process, the bent section 117b is not compressed and stress concentration thereon can be reduced or prevented.

Figure 3A:
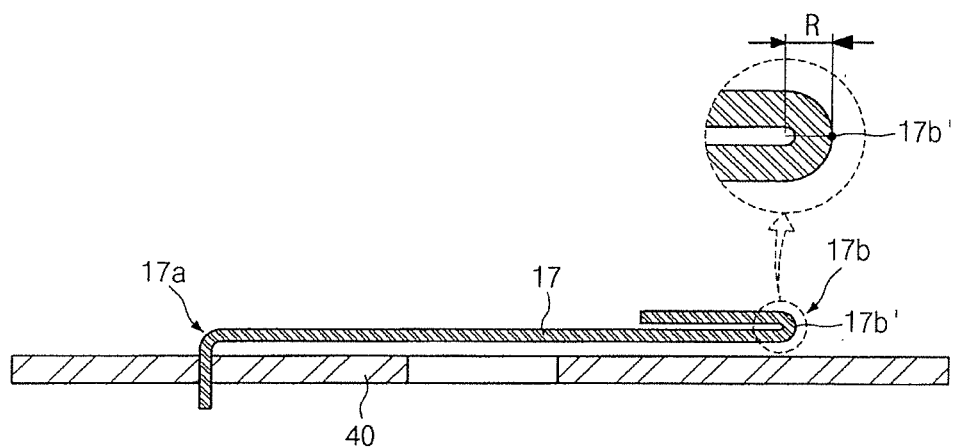
FIG. 3A is a cross-sectional detail view of an outer radius of curvature according to a pressing process of the conventional cylinder type secondary battery.
Figure 3B:
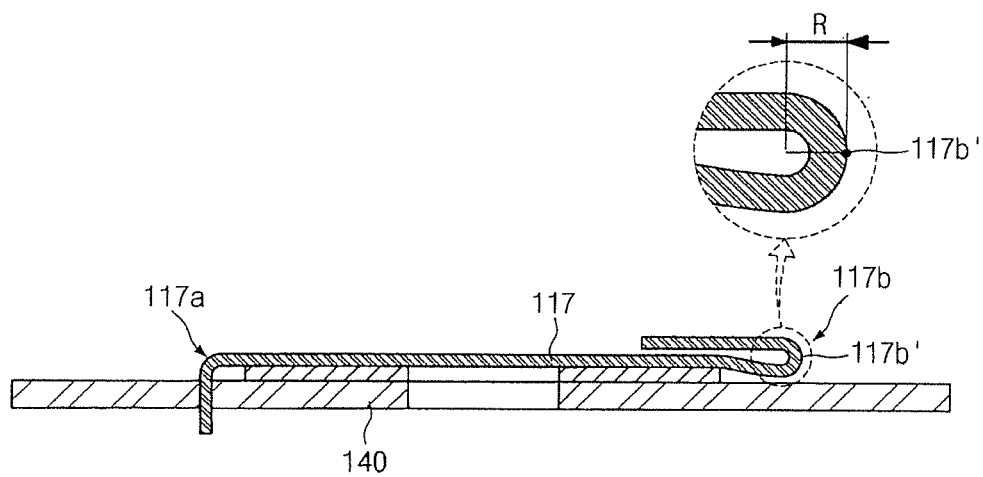
FIG. 3B is a cross-sectional detail view of an outer radius of curvature a pressing process of a cylinder type secondary battery in accordance with a first exemplary embodiment of the present invention.

FIG. 3A is a cross-sectional view of an outer radius of curvature according to a pressing process of the conventional cylinder type secondary battery, and FIG. 3B is a cross-sectional view of an outer radius of curvature according to a pressing process of a cylinder type secondary battery in accordance with a first exemplary embodiment of the present invention. Here, the outer radius of curvature means a radius of curvature of an outer surface of the bent section.

First, referring to FIG. 3A, the conventional cylinder type secondary battery has a first electrode tab 17 over an upper insulating plate 40, and the first electrode tab 17 includes a first section 17a and a second section 17b.

While the outer radius of curvature of the first section 17a of the first electrode tab 17 is not greatly affected by the pressing process, the outer radius of curvature R of the bent section 17b with reference to a bent point 17b is substantially reduced. Reduction in the outer radius of curvature R means increase in tensile stress of the bent point. Therefore, increase in stress causes cracks at the bent point and the electrode tab may become detached. In addition, while not shown, there is an inner radius of curvature formed on an inner surface of the bent portion, and a compression stress is increased at a bent point of the inner radius of curvature. However, since cracks are easily generated by the tensile stress, rather than the compression stress, the present invention will consider only the outer radius of curvature R. Here, the bent point 17b' has the smallest radius of curvature in the second section 17b.

Next, referring to FIG. 3B, the cylinder type secondary battery in accordance with an exemplary embodiment of the present invention includes a first electrode tab 117 formed over an upper insulating plate 140. The first electrode tab 117 includes first and second section 117a and 117c and a bent section 117b. A support plate 142 is disposed on the upper insulating plate 140.

In addition, provided that a distance from an edge of the first section 117a to an edge of the bent section 117b is a length L, both ends of the support plate 142 are designed to be positioned within the length L, and, in particular, an end of the support plate 142 is positioned inside the bent section 117b such that a portion of the bent section protrudes from the peripheral edge of the support plate. As a result, the bent section 117b is disposed in a space formed by the step between the upper insulating plate 140 and the support plate 142. In other words, a portion of the bent section 117b is adjacent to and overlaps the peripheral edge of the support plate 142.

Since the bent section 117b can be pushed into the space formed by the step between the upper insulating plate and the support plate, the bent section 117b is not compressed and stress concentration thereon is reduced or prevented.

That is, since the outer radius of curvature of the first section 117a of the first electrode tab 117 is not greatly affected by the pressing process and neither is the outer radius of curvature of the bent section 117b greatly affected with reference to a bent point 117b', a tensile stress is not substantially increased at the bent point and detachment of the electrode tab at the bent point is prevented. Here, the bent point 117b' has the smallest radius of curvature on the second section 117b.

An increase in resistance (IR) due to the outer radius of curvature and detachment of the electrode tab of the bent section were estimated.

In the following Table 1, Condition 1 corresponds to pressing of a conventional cylinder type secondary battery as described above, and Conditions 2 to 4 correspond to pressing of the cylinder type secondary battery in accordance with an exemplary embodiment of the present invention. That is, Condition 1 corresponds to a structure in which a support plate is not disposed over an upper insulating plate, and Conditions 2 to 4 correspond to a structure in which a support plate is disposed over an upper insulating plate. Here, in Conditions 1 to 4, an upper insulating plate having a thickness of 0.5 mm was used, and in Conditions 2 to 4, support plates having thicknesses of 0.5 mm, 0.3 mm, and 0.17 mm, respectively, were used. In addition, in each of Conditions 1 to 4 six batteries were tested.

Conditions 1 to 4 were estimated through a drum test, which is conventionally used in this art. The drum test was performed at a rotation speed of 66 rpm to measure an initial resistance and periodical resistances, thereby determining whether an electrode tab is detached or not.

Measurements of the periodical resistances were performed after rotations of 100, 130, 160 and 190 minutes. Here, 100 minutes corresponds to a reference for commercialization, 130 minutes corresponds to a reference for obtaining margin, 160 minutes corresponds to a reference for obtaining additional margin, and 190 minutes corresponds to a reference for obtaining improved margin. Fundamentally, the reference for commercialization must be satisfied, and for the purpose of mass production, the reference for obtaining the margin must be satisfied.

The results are as follows;

TABLE 1

| Classification | Outer radius of curvature (mm) | Sub-classification | Results (Ω) Beginning | 100 minutes | 130 minutes | 160 minutes | 190 minutes |
| --- | --- | --- | --- | --- | --- | --- | --- |
| Condition 1 | 0.32 | 1 | 21 | Detached | | | |
| | | 2 | 21 | 35.8 | 81.3 | Detached | |
| | | 3 | 20 | 35.1 | 36.0 | Detached | |
| | | 4 | 18 | 38.0 | Detached | | |
| | | 5 | 22 | 34.0 | Detached | | |
| | | 6 | 19 | 35.8 | Detached | | |
| Condition 2 | 0.6 | 1 | 21 | 21 | 21 | 22 | 22 |
| | | 2 | 22 | 23 | 24 | 24 | 25 |
| | | 3 | 18 | 20 | 21 | 23 | 22 |
| | | 4 | 18 | 20 | 22 | 22 | 22 |
| | | 5 | 20 | 19 | 20 | 20 | 20 |
| | | 6 | 20 | 19 | 27 | 24 | 26 |
| Condition 3 | 0.5 | 1 | 18 | 16 | 45 | Detached | |
| | | 2 | 19 | 16 | 16 | Detached | |
| | | 3 | 18 | 17 | 34 | Detached | |
| | | 4 | 18 | 15 | 17 | 19 | 20 |
| | | 5 | 18 | 16 | 16 | 15 | 17 |
| | | 6 | 17 | 21 | 21 | Detached | |
| Condition 4 | 0.4 | 1 | 21 | 18 | Detached | | |
| | | 2 | 21 | 17 | 18 | Detached | |
| | | 3 | 20 | 18 | Detached | | |
| | | 4 | 18 | 17 | Detached | | |
| | | 5 | 22 | 18 | 20 | Detached | |
| | | 6 | 19 | 16 | 26 | Detached | |

Referring to Table 1, Condition 1, in which the conventional cylinder type secondary battery was pressed, corresponds to the outer radius of curvature of 0.32 mm due to the pressure applied to the bent section. In this case, the first electrode tab was detached due to stress concentration, not satisfying the reference for commercialization, 100 minutes. In addition, even when the tab was not detached, resistance was remarkably increased. Further, the tab was frequently detached, not satisfying the reference for obtaining margin, 130 minutes. Further, it will be appreciated that the resistance was remarkably increased and productivity reduced even when the tab was not detached.

Furthermore, Condition 4, in which the support plate of 0.17 mm was used and had the outer radius of curvature 0.4 mm, satisfied the reference for commercialization, 100 minutes, using the support plate. It will be appreciated that Condition 4 did not satisfy the reference for obtaining margin and was detached, reducing productivity.

However, Condition 2 using the support plate of 0.5 mm and having the outer radius of curvature 0.6 mm satisfied the reference for obtaining improved margin without being detached. In addition, it had the advantage that the resistance was not largely increased at the initial resistance. Condition 3 using the support plate of 0.3 mm and having the outer radius of curvature 0.5 mm satisfied the reference for specification and was not detached even after 130 minutes, the reference for obtaining margin, providing good productivity.

Therefore, in one embodiment the outer radius of curvature of the second section is about 0.5 mm or more.

When the thickness of the support plate is larger than 0.5 mm, since the space formed by the step between the upper insulating plate and the support plate becomes larger, the outer radius of curvature can remain larger. However, in consideration of the overall size of the battery, a smaller space between the cap assembly and the upper insulating plate is preferable. Therefore, when the thickness of the support plate is larger than 0.5 mm, since a gap between the cap assembly and the support plate is already small before the pressing process, the pressure may be transmitted to the electrode assembly to cause damage to the electrode plate when the pressing process is performed.

For example, when the thicknesses of the support plates are about 0.5 mm and about 0.6 mm, respectively, provided that the overall height of the battery before the pressing process is a certain height, the gap between the cap assembly and the support plate is reduced more when the support plate has a thickness of about 0.6 mm than when the support plate has a thickness of about 0.5 mm. Therefore, the support plate having a thickness of about 0.6 mm had a small gap between the cap assembly and the support plate, and thus the pressure applied during the pressing process penetrated to the electrode assembly, thereby causing damage to the electrode plate of the electrode assembly.

In one embodiment, the support plate has a thickness of 0.3 mm to 0.5 mm. In addition, in one embodiment the bent section has an outer radius of curvature about 0.5 mm, and in consideration of the thickness of the support plate 0.5 mm or less, the outer radius of curvature R of the bent section is about 0.6 mm or less.

Figure 4:
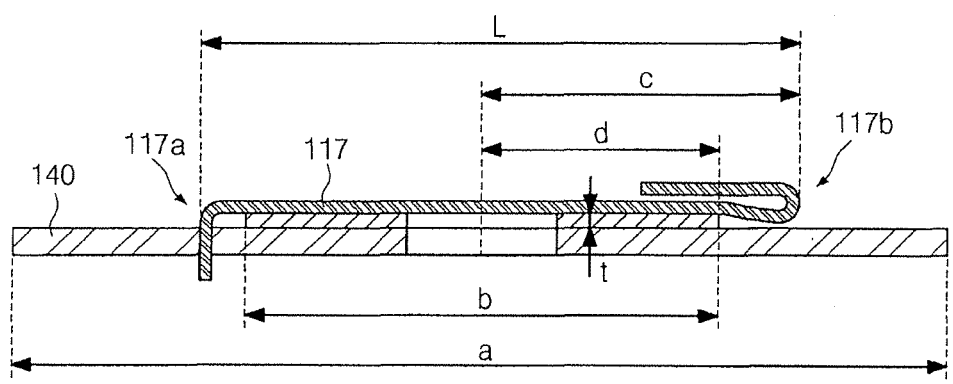
FIG. 4 is a cross-sectional view of relationship between the length of a first electrode tab and the length of a support plate of the cylinder type secondary battery in accordance with an exemplary embodiment of the present invention.

FIG. 4 is a cross-sectional view of relationship between the length of a first electrode tab and the length of a support plate of the cylinder type secondary battery in accordance with an exemplary embodiment of the present invention.

As described above, provided that the length from an edge of the first section 117a to an edge of the bent section 117b is a length L, both ends of the support plate 142 are designed to be positioned within the length L, and, in particular, an end of the support plate 142 is positioned inside the bent section 117b such that a portion of the bent section protrudes. As a result, the second section 117b can be positioned in the space formed by the space between the upper insulating plate 140 and the support plate 142.

Here, a length "a" designates the diameter of the upper insulating plate 140, a length "b" designates the diameter of the support plate 142 (corresponding to the length of the support plates seen from a cross-sectional view), a length "d" designates the length from a center of the upper insulating plate to the peripheral edge of the support plate, a length "c" designates the length from the center of the upper insulating plate to a peripheral edge of the bent section 117b, and a thickness "t" designates the thickness of the support plate.

As described above, since the first section 117a has a generally "Γ" or "⅂" shape, the outer radius of curvature of the first section 117a is not largely reduced even after the pressing process, and thus stress is not concentrated. Therefore, unlike the bent section, the first section needs no space into which the first is pushed during the pressing process, and thus, whether a space exists under the first section or not presents no significant problem.

However, since the second section 117b has a generally "C" shape, and large variation in the outer radius of curvature may be caused during the pressing process. In order to reduce the variation in outer radius of curvature, a space is provided formed by the step between the upper insulating plate and the support plate.

Next, a relationship between the length "d" from the center of the upper insulating plate 140 to a peripheral edge of the support plate 142 and the length "c" from the center of the upper insulating plate to a peripheral edge of the bent section 117b were measured in order to satisfy a range of the outer radius of curvature of the bent section.

In the following Table 2, in Conditions 5 and 6 a first electrode tab including on upper plate having a thickness of 0.5 mm and the length L of 9.42 mm from the first section to the bent section was used. In addition, in Condition 5 the support plate having a thickness of 0.5 mm was used, and in Condition 6 the support plate having a thickness of 0.3 mm was used.

As described above, in one embodiment the support plate has a thickness of about 0.3 mm to about 0.5 mm and the bent section has an outer radius of curvature of about 0.5 mm to about 0.6 mm. The length ratio of d/c was measured so that the outer radius of curvature R becomes about 0.5 mm to about 0.6 mm within a thickness range of the support plate of about 0.3 mm to about 0.5 mm.

Measurement results are as follows:

TABLE 2

| Classification | L (mm) | Thickness of upper insulating plate | Thickness of support plate | Outer radius of curvature | Ratio of d/c |
|---|---|---|---|---|---|
| Condition 5 | 9.42 | 0.5 mm | 0.5 mm | 0.6 mm | 98% |
| Condition 6 | 9.42 | 0.5 mm | 0.3 mm | 0.6 mm | 97% |

TABLE 3

| Classification | L (mm) | Thickness of upper insulating plate | Thickness of support plate | Outer radius of curvature | Ratio of d/c |
|---|---|---|---|---|---|
| Condition 5 | 9.42 | 0.5 mm | 0.5 mm | 0.5 mm | 85% |
| Condition 6 | 9.42 | 0.5 mm | 0.3 mm | 0.5 mm | 84% |

In order to position the bent section in the space formed by the step between the upper insulating plate and the support plate, the end of the support plate is formed to be positioned inside the second section. In addition, the support plate may have a thickness of about 0.3 mm to about 0.5 mm, and the outer radius of curvature of the bent section may be about 0.5 mm to about 0.6 mm, as described above.

Referring to Table 2, when the support plate had a thickness of 0.5 mm, the length "d" corresponding to the outer radius of curvature of the bent section of 0.6 mm corresponded to 98% of the length "c". When the support plate had a thickness of 0.3 mm, the length "d" corresponding to the outer radius of curvature of the bent section of 0.6 mm corresponded to 97% of the length "c".

In addition, referring to Table 3, when the support plate had a thickness of 0.5 mm, the length "d" corresponding to the outer radius of curvature of the bent section 0.5 mm corresponded to 85% of the length "c". When the support plate had a thickness of 0.3 mm, the length "d" corresponding to the outer radius of curvature of the bent section 0.5 mm corresponds to 84% of the length "c".

Therefore, in one embodiment, in order for the outer radius of curvature to between about 0.5 mm to about 0.6 mm while the thickness of the support plate is within the range of about 0.3 mm to about 0.5 mm, the length "d" from the center of the upper insulating plate to the peripheral edge of the support plate may be about 85% to about 97% of the length "c" from the center of the upper insulating plate to the bent section.

Figure 6:
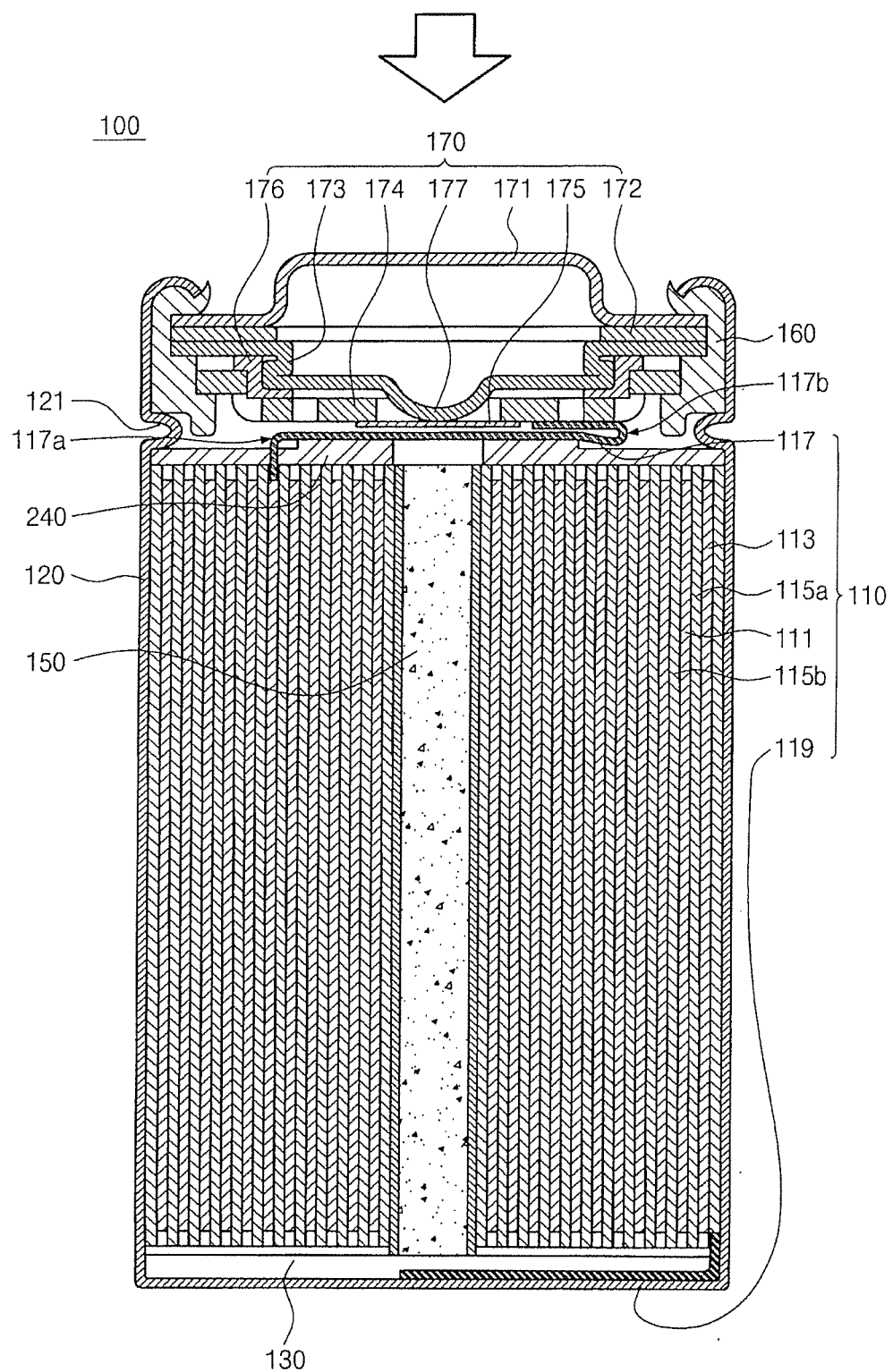
FIG. 6 is a cross-sectional view of a cylinder type secondary battery in accordance with a second exemplary embodiment of the present invention.

FIG. 6 is a cross-sectional view of a cylinder type secondary battery in accordance with a second exemplary embodiment of the present invention.

The cylinder type secondary battery in accordance with a second exemplary embodiment of the present invention may substantially be the same as the cylinder type secondary battery in accordance with a first exemplary embodiment of the present invention, except for the following description.

Referring to FIG. 6, the cylinder type secondary battery in accordance with a second exemplary embodiment of the present invention has a projection 242 integrally formed at an inner region of the upper insulating plate 240, unlike the first embodiment in which the support plate is separately formed from the upper insulating plate.

That is, the cylinder type secondary battery in accordance with a second exemplary embodiment of the present invention includes the projection 242 projecting from the inner region of the upper insulating plate 240 so that a central region has a thickness larger than a peripheral region thereof. As a result, the projection functions as the support plate of the first embodiment.

As can be seen from the foregoing, a cylinder type secondary battery in accordance with an exemplary embodiment of the present invention can improve reliability of the secondary battery.

In addition, it is possible to reduce or prevent stress concentration on a bent portion of an electrode tab.

Although embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A cylinder type secondary battery comprising:
    a can having an opening;
    an electrode assembly in the can;
    a cap assembly covering the opening of the can;
    an upper insulating plate between the electrode assembly and the cap assembly;
    a support plate on the upper insulating plate; the support plate including a planar surface having a peripheral edge defining an outermost perimeter of the support plate, wherein an area of the support plate is smaller than an area of the upper insulating plate; and
    a first electrode tab extending from the electrode assembly, the first electrode tab having a first section contacting the support plate, a second section contacting the cap assembly, and a bent section between the first section and the second section and extending in a first direction substantially parallel to the planar surface, wherein a portion of the bent section protrudes past the peripheral edge of the support plate in the first direction.

2. The cylinder type secondary battery of claim 1, wherein the support plate comprises an insulating material.

3. The cylinder type secondary battery of claim 2, wherein the insulating material is polyethylene or polypropylene.

4. The cylinder type secondary battery of claim 1, wherein a portion of the bent section is adjacent to and overlaps the peripheral edge of the support plate.

5. The cylinder type secondary battery of claim 1, wherein the support plate and the upper insulating plate comprise the same material.

6. The cylinder type secondary battery of claim 1, wherein the support plate has a central through-hole.

7. The cylinder type secondary battery of claim 1, wherein the support plate is circular, rectangular or hexagonal.

8. The cylinder type secondary battery of claim 1, wherein a thickness of the support plate is from about 0.3 mm to about 0.5 mm.

9. The cylinder type secondary battery of claim 1, wherein a length from the center of the upper insulating plate to the peripheral edge of the support plate is from about 85% to about 97% of a length of the first electrode tab extending from a center of the upper insulating plate to a periphery of the bent section.

10. The cylinder type secondary battery of claim 1, wherein the upper insulating plate and the support plate are integral to one another.

11. The cylinder type secondary battery of claim 1, wherein the upper insulating plate and the support plate are modular.

12. A cylinder type secondary battery comprising:
    a can having an opening;
    an electrode assembly in the can;
    a cap assembly covering the opening of the can;
    an upper insulating plate between the electrode assembly and the cap assembly, the upper insulating plate including a central section and a peripheral section surrounding the central section, wherein the central section includes a planar surface having a peripheral edge defining an outermost perimeter of the central section and wherein a thickness of the central section is greater than a thickness of the peripheral section; and
    a first electrode tab extending from the electrode assembly, the first electrode tab having a first section contacting the central section of the upper insulating plate, a second section contacting the cap assembly, and a bent section between the first section and the second section, wherein a portion of the bent section extends in a first direction substantially parallel to the planar surface of the central section and protrudes past the peripheral edge of the central section in the first direction.

13. The cylinder type secondary battery of claim 12, wherein a thickness of the central section of the upper insulating plate is from about 0.3 mm to about 0.5 mm thicker than a thickness of the peripheral section of the upper insulating plate.

14. The cylinder type secondary battery of claim 12, wherein a length from the center of the upper insulating plate to the peripheral edge of the central section is from about 85% to about 97% of a length of the first electrode tab extending from a center of the upper insulating plate to a periphery of the bent section.

15. The cylinder type secondary battery of claim 12, wherein a radius of curvature of the bent section is from about 0.5 mm to about 0.6 mm.

16. A method of assembling a cylinder type secondary battery, the method comprising:
    inserting an electrode assembly into a can having an opening, the electrode assembly including a first electrode tab extending from the electrode assembly;
    placing an upper insulating plate between the electrode assembly and the cap assembly;
    placing a support plate on the upper insulating plate, the support plate having a planar surface and a peripheral edge defining an outermost perimeter of the support plate, wherein an area of the support plate is smaller than an area of the upper insulating plate;
    configuring a first section of the first electrode tab to extend parallel to the planar surface of the upper insulating plate and to contact the support plate;
    bending a second section of the first electrode tab to extend substantially parallel to the first section of the first electrode tab and to form a bent section between the first section and the second section, the bent section extending in a first direction substantially parallel to the planar surface;

covering the opening of the can with a cap assembly such that the second section of the first electrode tab contacts the cap assembly;

forming a bead portion around a periphery of the can such that the bead portion contacts the upper insulating plate; and pressing the cap assembly to move the cap assembly toward the electrode assembly such that a portion of the bent section moves closer to the electrode assembly and protrudes past the peripheral edge of the support plate in the first direction.

17. The method of claim 16, wherein a radius of curvature of the bent section remains substantially the same when pressing the cap assembly.

18. The method of claim 17, wherein the radius of curvature of the bent section is from about 0.5 mm to about 0.6 mm.

19. The method of claim 16, wherein pressing the cap assembly compresses the bead portion formed around the periphery of the can.

20. A cylinder type secondary battery comprising:
a can having an opening;
an electrode assembly in the can;
a cap assembly covering the opening of the can;
an upper insulating plate between the electrode assembly and the cap assembly;
a support plate on the upper insulating plate; the support plate including a planar surface having a peripheral edge defining an outermost perimeter of the support plate, wherein an area of the support plate is smaller than an area of the upper insulating plate; and
a first electrode tab extending from the electrode assembly, the first electrode tab having a first section contacting the support plate, a second section contacting the cap assembly, and a bent section between the first section and the second section and extending in a first direction substantially parallel to the planar surface, wherein the first electrode tab protrudes past a peripheral edge of the support plate in the first direction and wherein an outer radius of curvature of the bent portion is from about 0.5 mm to about 0.6 mm.

21. The cylinder type secondary battery of claim 20, wherein a portion of the bent section is adjacent to and overlaps the peripheral edge of the support plate.

22. The cylinder type secondary battery of claim 20, wherein a portion of the bent section protrudes from the peripheral edge of the support plate.

23. The cylinder type secondary battery of claim 20, wherein the support plate and the upper insulating plate comprise the same material.

24. The cylinder type secondary battery of claim 20, wherein the upper insulating plate and the support plate are integral to one another.

25. The cylinder type secondary battery of claim 20, wherein the support plate is circular, rectangular or hexagonal.

26. The cylinder type secondary battery of claim 20, wherein a thickness of the support plate is from about 0.3 mm to about 0.5 mm.

* * * * *